United States Patent Office.

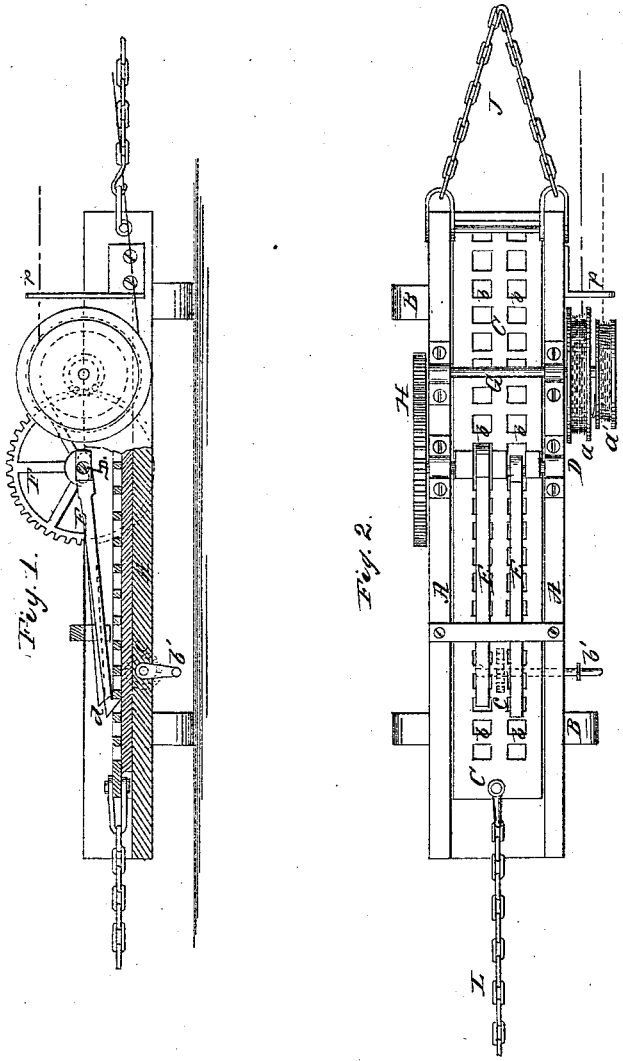

GEORGE W. TOWNSEND, OF GALESBURG, MICHIGAN.

Letters Patent No. 64,384, dated April 30, 1867.

IMPROVEMENT IN STUMP-EXTRACTOR.

*The Schedule referred to in these Letters Patent and making part of the same.*

TO ALL WHOM IT MAY CONCERN:

Be it known that I, Rev. GEORGE W. TOWNSEND, of Galesburg, in the county of Kalamazoo, and State of Michigan, have invented a new and improved Stump-Extractor; and I do hereby declare that the following is a full, clear, and exact description thereof, which will enable others skilled in the art to make and use the same, reference being had to the accompanying drawings, forming part of this specification.

My invention consists in constructing a machine for extracting stumps from the ground in such a manner that I am able to exert a very great force upon the stump in a horizontal direction with very simple appliances, as will hereinafter appear.

Figure 1 represents a side elevation of my machine shown partly in section.

Figure 2 is a plan or top view.

Similar letters refer to corresponding parts in the drawing.

My machinery is attached to a long rectangular frame lying horizontally and placed on runners. The frame is composed (mainly) of three pieces, a bottom and two parallel side timbers. The sides extend above the bottom, so that the bottom and side timbers form a trough. The draught-bar (to which the power is applied and which is attached to the stump by chains) slides upon the bottom when it is moved by the machinery.

A represents this frame or trough; B the runners upon which it is placed. C is the draught-bar. D represents a double crank-shaft placed transversely across the side timbers. E represents the draught-pitmen attached to the cranks at one end. F is a gear-wheel on the crank-shaft D. G is another shaft lying parallel with D, having a pinion on one end which works in the gear-wheel F. H represents the pinion. On the other end of this shaft are two drums, $a$ and $a'$. The gearing and the drums are all on the ends of the shafts outside the side timbers or frame. The draught-bar C is a broad, flat bar of iron having a double row of holes, $b$, through it, as seen in fig. 2. The position of these rows corresponds with the position of the cranks on the shaft D. The draught-pitmen E, as before stated, are attached to the cranks at one end in the manner that pitmen usually are attached. The other ends lie loosely upon the draught-bar, and have hooks $d$ upon their ends which drop into the holes $b$ in the draught-bar when the cranks are revolved. These hooks work in the holes alternately, as will be seen by the position of the cranks. When one pitman is operating upon the draught-bar the other one is going forward to take a new hold. In this way the power exerted upon the draught-bar is constant. The draught-bar C is drawn back by a crank, $b'$, on the end of a shaft under the bar, having a pinion, $c$, upon it, which works into a rack on the under side of the bar. This crank is operated by hand. The two drums $a$ and $a'$ have each a rope, and are so arranged that when one rope is being unwound or operating the machine, the other rope is being wound up around the other drum. There is a spring-coupling between these two drums, so arranged that the drum $a'$ will work loose upon the shaft when turned back, but when turned the other way it couples into the other drum $a$ and drives the machine at the same time it winds up the rope around $a$. The power which drives the machine is attached to these ropes alternately as one or the other is always ready to operate the machine. J represents chains by which the machine is anchored. L represents the chain which is attached to the stump from the end of the draught-bar C. $p$ represents a stand attached to the side of the frame, with holes or apertures through it for the ropes to pass. These holes act as guides to keep the ropes in place on the drums. The operation of the machine will be at once understood from the drawing without further description. It is allowed that power exerted horizontally on the stump is used with better effect than in any other direction. My machine being designed for this especial application, is not only superior to stump-extractors of a different construction, but is much more easily moved, handled, and applied.

I do not confine myself to the particular arrangement herein described; that may be modified in different ways; but what I do claim as new, and desire to secure by Letters Patent, are—

The pulleys $a$ and $a'$, arranged substantially as herein shown and described, in combination with the draught-bar C and pitmen E.

I claim the double crank-shaft D, the gear-wheel F, and the pinion H, in combination with the draught-bar C and pitmen E, substantially as herein specified.

GEORGE W. TOWNSEND.

Witnesses:
S. BRISTOL,
J. C. BRISTOL.